L. M. MASSON.
BRAKE DEVICE.
APPLICATION FILED MAR. 14, 1914.
1,215,949.
Patented Feb. 13, 1917.
5 SHEETS—SHEET 1.
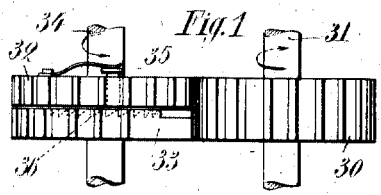
Inventor,
Louis Maxime Masson

L. M. MASSON.
BRAKE DEVICE.
APPLICATION FILED MAR. 4, 1914.

1,215,949.

Patented Feb. 13, 1917.
5 SHEETS—SHEET 2.

Attest:
Ewd L. Tolson
H. L. Alden

Inventor:
Louis Maxime Masson,
by Spear, Middleton, Donaldson & Spear
Attys

L. M. MASSON.
BRAKE DEVICE.
APPLICATION FILED MAR. 14, 1914

1,215,949.

Patented Feb. 13, 1917.
5 SHEETS—SHEET 3.

Attest:
Ewd L Tolson
H L Alden

Inventor,
Louis Maxime Masson,
by Spear, Middleton, Donaldson & Spear
Attys

L. M. MASSON.
BRAKE DEVICE.
APPLICATION FILED MAR. 14, 1914.
1,215,949.
Patented Feb. 13, 1917.
5 SHEETS—SHEET 4.
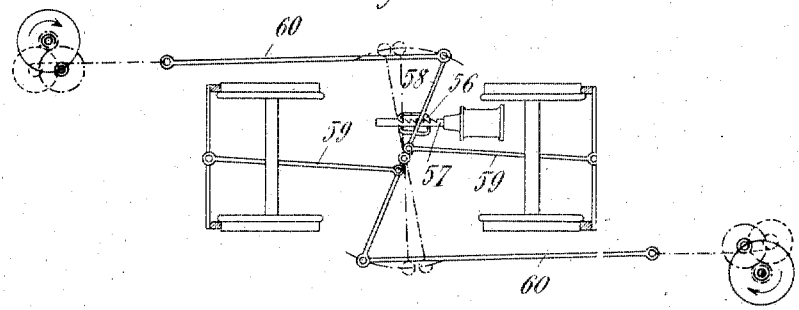
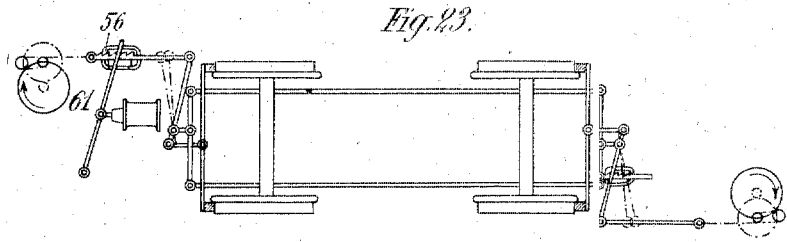
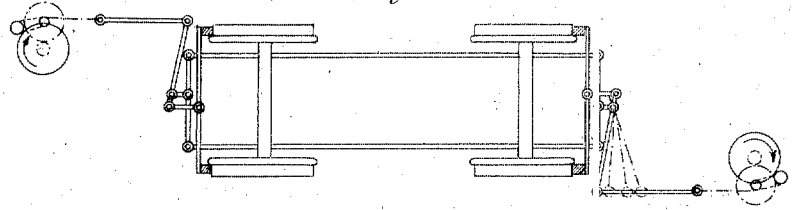
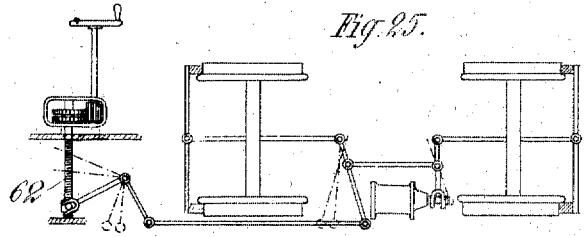
Attest:
Ewd L Tobson
H. L. Alden
Inventor
Louis Maxime Masson,
by Spear, Middleton, Donaldson & Spear
Attys

L. M. MASSON.
BRAKE DEVICE.
APPLICATION FILED MAR. 14, 1914.

1,215,949.

Patented Feb. 13, 1917.
5 SHEETS—SHEET 5.

Attest:
Ewd L. Tolson
H. L. Alden

Inventor,
Louis Maxime Masson,
by Spear, Middleton, Donaldson & Spear
Attys

UNITED STATES PATENT OFFICE.

LOUIS MAXIME MASSON, OF ROMAINVILLE, FRANCE.

BRAKE DEVICE.

1,215,949.   Specification of Letters Patent.   Patented Feb. 13, 1917.

Application filed March 14, 1914. Serial No. 824,745.

*To all whom it may concern:*

Be it known that I, LOUIS MAXIME MASSON, a citizen of the French Republic, residing at Romainville, Seine, France, have invented certain new and useful Improvements in Brake Devices, of which the following is a specification.

This invention relates to a control for brakes of any kind based on the use of a combination of toothed wheels arranged in such a manner that one of the toothed pinions can stop in a given position, while allowing the other pinions to continue their movement. The stopping of the said pinion, for instance in the direction of tightening of the brake, is obtained by doing away with its teeth along a certain portion. This pinion can therefore be considered as regards its shape as a sector. In the opposite direction, that is to say, in the direction of releasing, a pawl is provided and has for its object to bring the teeth again into engagement, and to render all the pinions solidary with each other.

This device is applicable to any type of brake control for vehicles or machines such as cranes, winches, etc., in which it is necessary to insure, at the release, a constant play between the part used for braking (brake blocks or brake band on pulley, wheel, or drum, shoes or drags on rails, etc.,) and the part to be braked, whatever be the wear that may have been produced during the preceding braking.

On the other hand, the position of the pinion with interrupted teeth, from the beginning of the tightening to the moment when it leaves the teeth of the driving pinion, enables it to control a part (eccentric, cam, pulley, screw, etc.,) having for its object to absorb a certain travel for increasing the speed of tightening.

In railways and tramways the brakes are generally controlled by a spindle with a crank or a hand wheel, on which is wound the traction chain of the brake rigging or system of rods, or by a screw on which travels a nut. These arrangements are such that the proportion between the driving effort and the resulting effort on the blocks is always constant, and that the blocks, at the moment when the application of the brakes begins, being away from the wheels, begin to come nearer the latter with a speed always proportional to the number of revolutions made by the hand wheel or the crank in a given time.

The same conditions obtain in releasing the blocks. Only a few revolutions of the crank or hand wheel are necessary to move the blocks out of contact with the wheels, but a number of revolutions are required before the blocks are sufficiently withdrawn.

The present invention which obviates the drawbacks in question, has for its object;

1. To bring the shoes quickly near the wheels, and then, at the moment when they are in contact, to press them with the maximum pressure.

2. To insure constantly and in an accurate manner, the same play at the release, which results in an automatic adjustment until the complete wearing out of the blocks.

Various constructions and applications of the said control device are illustrated by way of example in the accompanying drawings, in which:—

Figures 1 and 2 show respectively in elevation and in plan the chief parts of the device, in the construction with the usual form of gear wheels.

Figs. 3 and 4 show in elevation and in plan the same combination of parts with inner teeth.

Fig. 5 shows in section the same parts made of bevel pinions.

Fig. 6 shows in front elevation and section the same device consisting of spur pinions and of a tooth rack.

Fig. 7 shows in longitudinal elevation a practical construction of the chief parts shown in Fig. 1 and coöperating with an eccentric.

Fig. 8 shows in horizontal section on lines 8—8 of Fig. 7 the same parts in released position.

Fig. 9 is a view similar to Fig. 8, the parts being in the tightened position, but with different positions, which can be obtained by moving the eccentric, being diagrammatically indicated.

Figure 19:
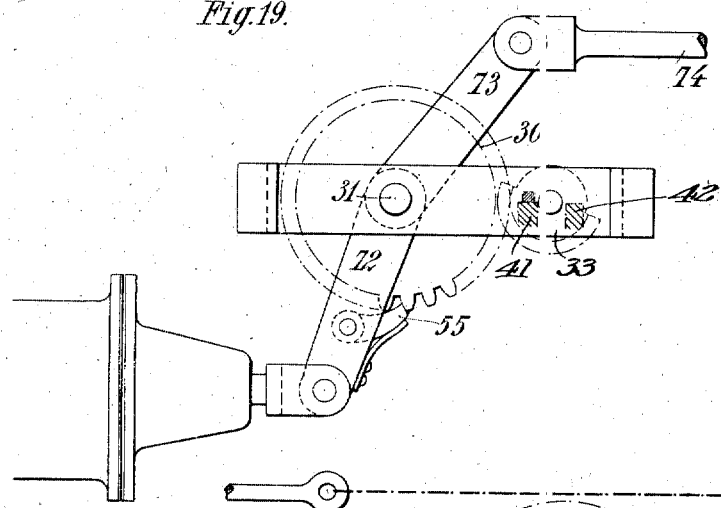
Figure 20:
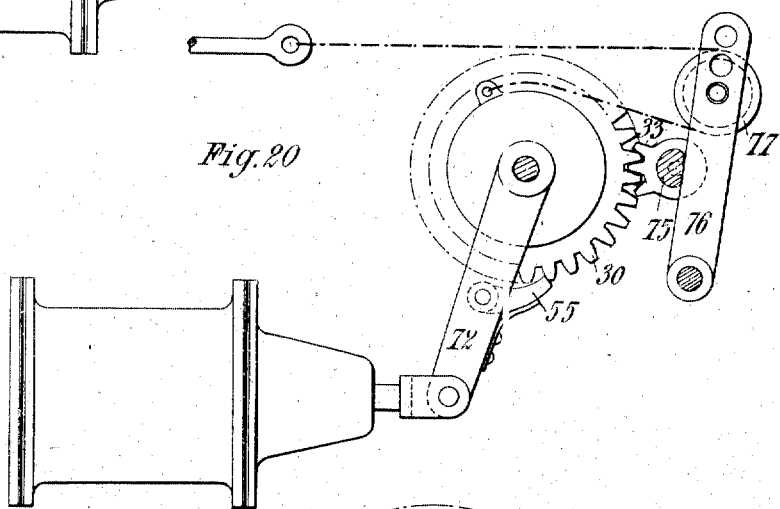
Figure 21:
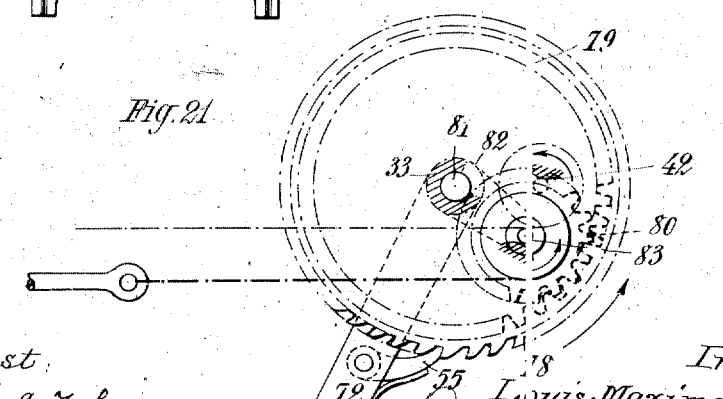

Figs. 19, 20, and 21 are partial views in plan of various applications of the device operated by a driving cylinder.

Figs. 22–25 are diagrams showing different methods of arranging the brake rods or rigging, operated by means of the device according to this invention.

Fig. 26 is a longitudinal elevation, and

Figure 27:
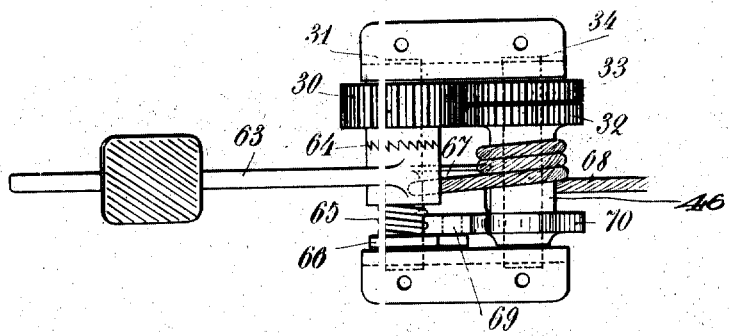

Fig. 27 a plan of the application of the invention to braking a motor vehicle.

The various apparatus shown in the accompanying drawing can vary as regards their construction, but are based on the chief characteristic features shown in Figs. 1–6.

Figs. 1 and 2 show a construction of the invention having cylindrical wheels with straight teeth. In this construction the pinion 30 keyed to the driving shaft 31, imparts movement to superposed pinions 32 and 33, one of which, 32, is keyed, and the other one, 33, is loose on the spindle 34. The teeth of the loose pinion 33 are interrupted and the said pinion stops at given moments. A pawl 35 secured to one of the pinions 32 and engaging with a ratchet wheel 36 secured to the other pinion 33, causes the teeth of the pinion 33 to come again into engagement with the toothed wheel 30, the two toothed wheels 30 and 32 always remaining in contact. The transmission of movement can be effected by the shaft 31 or by the spindle 34, the pawl device being arranged accordingly.

Figs. 3–6 are derivations of the same device in which one of the toothed wheels is a wheel 37 with inner teeth (Figs. 3 and 4), a bevel pinion 38 (Fig. 5) or a tooth rack 39 (Fig. 6).

Fig. 7 shows a construction of a control for brakes with chain, in which the pinion 33 with interrupted teeth is secured to an eccentric 40 which it controls and over which passes the chain of the brake before being wound on the shaft 31. The movement of the eccentric 40 has for its object to absorb, during the tightening (Fig. 9), a length of chain added to that wound at the same time on the shaft 31 which, after the stopping of the eccentric 40, can continue to rotate under the action of the pinions 32 and 30 and produce the maximum tightening.

At the release (Fig. 8), the movement in the opposite direction of the eccentric 40 brings about an always constant disengagement whatever be the length of chain wound on the shaft 31. Stops 41, 42 limit the travel of the eccentric in both directions.

Figure 10:
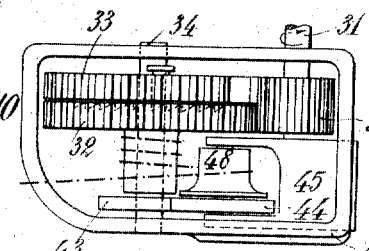
Fig. 10 shows in longitudinal elevation, and Fig. 11 in plan, another practical construction with combined eccentric and slide block.
Figure 12:
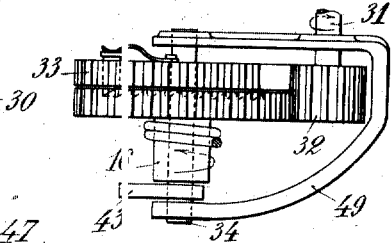
Fig. 12 shows in longitudinal elevation, and Fig. 13 in plan, a modified construction of the same device in the form of an oscillating shackle.
Figure 11:
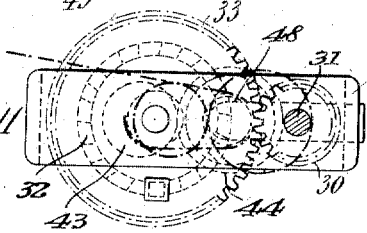
Figure 13:
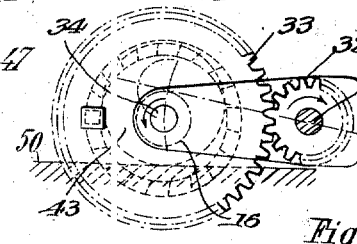

The construction shown in Figs. 10 and 11, is provided with a cam 43 which, by acting on a roller 44, moves longitudinally a shackle 45 sliding in a fixed bracket 47 and carrying a pulley 48 over which the chain passes and its slack is taken up. In this construction, the pinion with interrupted teeth is secured to the cam 43 by the spindle 34, and the combination of the movement of winding of the chain during the tightening, is effected by means of the pinion 32, the hub of which constitutes the winding drum for the chain. The construction shown in Figs. 12 and 13, is a similar type of toothed wheels, but in this case the play is taken up by the movement of the spindle 34 and of the two pinions 32 and 33 mounted on a bracket 49 pivoted about the driving shaft 31 and controlled by the cam 43. This cam rests during its rotation against a flat fixed surface 50 or against a roller.

Figure 14:
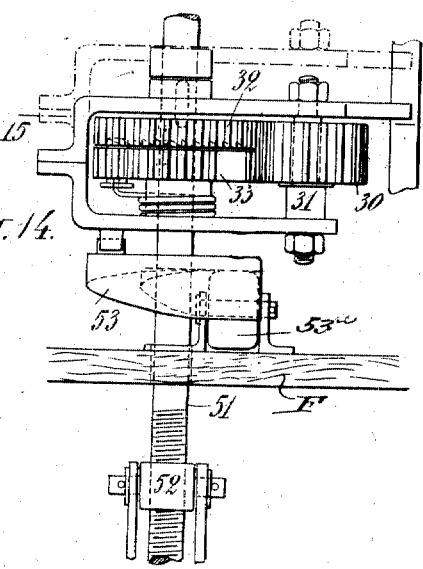
Fig. 14 is a longitudinal elevation of another modified construction in the form of a shackle sliding longitudinally on the driving shaft.

The construction shown in Fig. 14, is the application of my invention to a screw spindle 51 constituting the driving part, on which is arranged a nut 52 connected to the braking parts. The vertical movement of the screw 51 and of the nut 52 is obtained by means of a helical disk 53 controlled by the pinion 33, the nut 52 being able to continue its movement on the driving screw 51 under the action of the pinion 32. The helical disk 53 coöperates with a wheel 53ª mounted on a fixed part of the frame F to raise the parts into dotted line position.

The control, instead of being effected direct by the screw 51 could be effected by a spindle operating the pinion 30.

Figure 16:
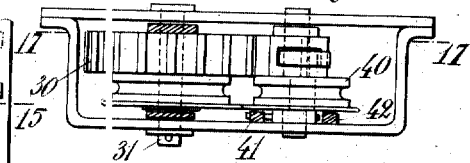
Fig. 16 is a longitudinal elevation of the same construction in which the pawl device is of a different construction from that shown in the preceding figures.
Figure 17:
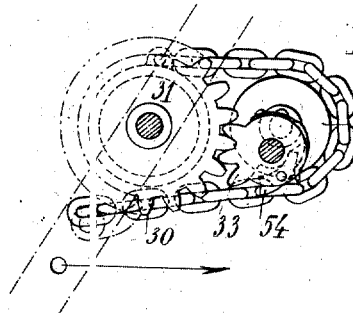
Fig. 17 is a horizontal section on line 17—17 of Fig. 16, the parts being in the position corresponding to the released position of the brake.
Figure 15:
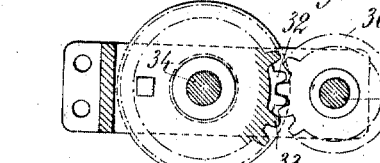
Fig. 15 is a section on line 15—15 of Fig. 14.
Figure 18:
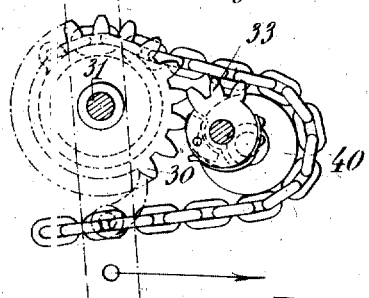
Fig. 18 is a similar section, the parts being in the position corresponding to the tightening position of the brake.

In the four constructions of toothed wheels shown in Figs. 1–6 the superposed pinions can be replaced by a single pinion (Figs. 16–18), one tooth 54 of which forms a pawl and insures the stoppage of the quickly moving part, while at the return the said movable tooth 54 has for its object to bring the teeth again into engagement and secure the toothed wheels together.

The same apparatus can be controlled by a brake cylinder provided with air brake.

Figs. 19–21 show modified constructions with simple action or quick action, but limiting in both cases the unwinding of the chain.

In the construction shown in Fig. 19, the device is simply applied for automatically taking up the play that may be produced in the parts of the air brake rods or rigging.

In this construction, the action of the piston is transmitted by means of a lever 72 with a pawl 55, to the wheel 30 with which engages the interrupted pinion 33 and the "pawl pinion", the main construction of which is indicated in Fig. 1. To the spindle 31 of the wheel 30 is keyed a lever 73 acting by means of a connecting rod 74 on the brake rods, stops 41 and 42 limiting the travel of the pinion 33.

In Figs. 20 and 21, the device is applied, in combination with an air brake, both for automatically taking up the play and for quick action of the brake.

In the construction shown in Fig. 20, the piston acts, as in Fig. 19, by means of the lever 72 and of the pawl 55 on the wheel 30. The interrupted pinion 33 drives the cam 75 which acts on a lever 76 carrying a pulley 77 over which passes the brake chain or cable.

In the construction shown in Fig. 21, the lever 72 with pawl 55 operated by the piston, acts on a ratchet wheel 78 provided with a rim 79 with inner teeth with which engages a pinion 80 secured to a pulley on which is wound the brake cable, and the spindle of which is supported by a lever 82 loose on the spindle 81 of the ratchet wheel 78. The said spindle 81 is fixed, and to the same is keyed the pinion 33 with interrupted teeth. When the ratchet wheel 78 is advanced by the action of the air piston, the rim 79 drives the pinion 80 which, at the same time developing about the fixed pinion 33, produces the winding of the cable in a quick movement until the moment when the spindle 83 strikes the fixed tappet 42. Beginning with that moment, the pinion 80 escapes the interrupted teeth of the pinions 33, which enables the rim 79 to continue its action on the said pinion 80 for bringing about the winding of the cable.

The object of the pawl 55 is to enable the piston always to return to the bottom of the cylinder whatever be the wear of the blocks.

This latter condition being necessary for utilizing the total stroke of the piston, in the case of adjustment by the hand brake on a system of brake rods with central balance beam as shown in Fig. 22, the piston is provided with a toothed bar 57 on which is mounted a bracket 56 supporting the lever 58 to which are attached the brake rods 59 of the brakes and connecting rods 60 for hand control. The distance between the lever 58 and the end of the bracket 56, corresponds to the normal travel for tightening or applying the brakes. If this travel is exceeded owing to the wear of the blocks, the bracket 56 advances on the bar 57 and falls under the action of its own weight, into the front tooth.

Fig. 23 shows that this device can be applied directly to a rod of the hand brake.

In the said Fig. 23, is also shown a method of adjustment of the air brake lever 61 for hand control of the brake.

Fig. 24 shows an ordinary system of brake rods operated by hand-control devices constructed in accordance with the invention.

Figure 25:
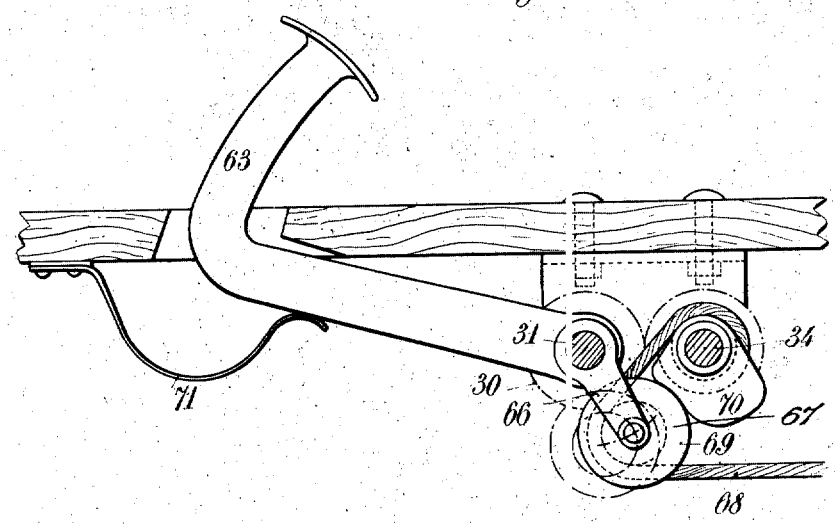

Fig. 25 shows the adjustment of a system of rods with air brake on a trailer car or truck provided with a hand brake with a screw 62 with which is combined the control device with quick action, in accordance with the construction in Fig. 14.

The advantages of this control device are as follows:

When applied to railway or tramway cars, a single apparatus can be arranged near the air cylinder or be made in one piece with the latter on each car.

In that way, the blocks of all the cars are always at the same distance from the wheels, and the braking action is exercised on all the wheels of the train at the same moment.

On the other hand, in view of the quick application of the blocks, the stroke of the piston, its cross-section or the pressure of the air can be reduced, which results in an economy in the consumption of compressed fluid.

For tramways, the apparatus mounted as a hand brake, enables the brake rods as well as the stroke of the piston of the air brake to be adjusted.

In road vehicles, namely in motor buses and lorries, the braking being effected on drums arranged on the rear wheels, the brake blocks or bands can be controlled by means of an apparatus hereinbefore described. In the case of the application shown in Figs. 26 and 27, the stroke of the pedal 63 is always constant, and a maximum effort is obtained with a minimum stroke.

In this construction, Figs. 26 and 27, the pedal lever 63 is keyed to the shaft 31 of the common pinion 30 which can freely rotate on the said shaft 31, and be coupled to the lever 63 by means of ratchet 64 held in engagement by the action of the spring 65. On the shaft 31 is mounted loose a lever 66 carrying, on the one hand, a pulley 67 over which passes the cable 68 of the brake, and, on the other hand, a roller 69 engaging with a cam 70 secured by means of the spindle 34 to the pinion 33 with interrupted teeth. The said cam 70 is extended by a recessed part co-operating with the roller 69 in order to limit the return travel of the cam. The pinion 32 is secured to the pulley 46 on which is wound the cable 68. A spring 71 has the tendency to raise the lever 63 to bring it back to its original position.

When the pedal lever 63 is lowered the coupling device 64 acts on the common pinion 30 in order to drive simultaneously the pinions 32 and 33, so that the cam 70 operated by pinion 33, acts on the roller 69 and the pulley 67 for bringing about quick movement of the cable 68. When the interrupted teeth of the pinion 33 leave the pinion 30, the cam 70 stops and keeps the roller 69 in engagement with the circumferential portion of its periphery while the pinion 32, continuing to rotate under the action of the pinion 30, winds the cable 68 so as to apply the brake.

During the return movement of the pedal, the release of the brake is always effected to a constant extent. If a wear takes place or a slackening in the brake parts, such wear or slack is automatically taken up by the coupling 64, the pedal completing its return travel after the stoppage of the cam.

The same pedal lever 63 could also be used at the same time for controlling the clutch of the engine, the automatic adjustment of the brake being independent of the position of the said pedal.

Generally speaking, the application of an apparatus fulfilling by itself one of the two principal conditions above referred to, or both simultaneously, can be made on any mechanism provided with a brake such as cranes, winches, machines, etc., in which it is advantageous to effect the adjustment automatically by quickly taking up any play at the moment of tightening.

What I claim as my invention and desire to secure by Letters Patent is:—

1. In a control device for the automatic adjustment of brakes comprising in combination a driving shaft, a pinion fixed thereto, a driven shaft, brake operating means associated therewith, a pinion with continuous teeth keyed thereon adapted to mesh with the pinion on said driving shaft, a second, mutilated pinion loosely carried on said driven shaft adapted to mesh at times with the pinion on the driving shaft, and coupling means between the mutilated and continuous pinion on said driven shaft adapted to insure a constant amount of play of the brake operating parts during the tightening and releasing operations, respectively.

2. A control device for the automatic adjustment of brakes, comprising in combination a mutilated pinion keyed to a spindle, a pinion with continuous teeth concentric with the mutilated pinion and loose on the said spindle, a third pinion with wide teeth gearing with the two first-mentioned pinions, a spring pawl secured to the pinion with continuous teeth and engaging with a ratchet wheel fixed to the mutilated pinion, brake-actuating means adapted to operate the brake quickly when the mutilated pinion is driven by the pinion with which it gears, means for locking said brake-actuating means when the mutilated pinion ceases to rotate, and means whereby the wear of the brake-actuating means is compensated and whereby a constant clearance is insured when the brake is released.

3. A control device for the automatic adjustment of brakes comprising a driving pinion, a cable drum secured thereto, a continuous tooth pinion and a mutilated pinion concentric with each other and both meshing with the driving pinion, a ratchet and pawl connection between said two concentric pinions, an eccentric drum secured to the mutilated pinion, and a brake-actuating cable secured to the cable drum and passing around said eccentric drum.

In testimony whereof I have signed my name to this specification in the presence of two subscribing witnesses.

LOUIS MAXIME MASSON.

Witnesses:
CHAS. P. PRESSLY,
GEORGES BONNEUIL.